United States Patent
Huang et al.

(10) Patent No.: US 11,924,705 B2
(45) Date of Patent: Mar. 5, 2024

(54) ANTENNA DEVICE, POSITIONING SYSTEM AND POSITIONING METHOD

(71) Applicant: PSJ INTERNATIONAL LTD., Tortola (VG)

(72) Inventors: Shih-Yi Huang, Kaohsiung (TW); Hao-Wei Chan, Taichung (TW); Ruey-Beei Wu, Taipei (TW)

(73) Assignee: PSJ INTERNATIONAL LTD., Tortola (VG)

( * ) Notice: Subject to any disclaimer, the term of this patent is extended or adjusted under 35 U.S.C. 154(b) by 298 days.

(21) Appl. No.: 17/580,589

(22) Filed: Jan. 20, 2022

(65) Prior Publication Data

US 2023/0044484 A1  Feb. 9, 2023

(30) Foreign Application Priority Data

Aug. 9, 2021  (TW) .................................. 110129215

(51) Int. Cl.
| | |
|---|---|
| *H04W 4/021* | (2018.01) |
| *H01Q 1/22* | (2006.01) |
| *H01Q 1/48* | (2006.01) |
| *H01Q 9/04* | (2006.01) |
| *H04W 4/029* | (2018.01) |

(52) U.S. Cl.
CPC .......... *H04W 4/021* (2013.01); *H01Q 1/2291* (2013.01); *H01Q 1/48* (2013.01); *H01Q 9/0421* (2013.01); *H04W 4/029* (2018.02)

(58) Field of Classification Search
CPC .... H04W 4/021; H04W 4/029; H01Q 1/2291; H01Q 1/48; H01Q 9/0421; H01Q 9/045

USPC ....................................................... 455/456.1
See application file for complete search history.

(56) References Cited

U.S. PATENT DOCUMENTS

| | | | |
|---|---|---|---|
| 5,955,994 A | * | 9/1999 | Staker .................. H01Q 19/005 |
| | | | 343/700 MS |
| 2007/0080886 A1 | | 4/2007 | Thomas et al. |
| 2019/0305428 A1 | | 10/2019 | Hwang et al. |

FOREIGN PATENT DOCUMENTS

| | | |
|---|---|---|
| TW | 200522437 A | 7/2005 |
| TW | 201943147 A | 11/2019 |

* cited by examiner

*Primary Examiner* — Ted M Wang
(74) *Attorney, Agent, or Firm* — Li & Cai Intellectual Property (USA) Office

(57) ABSTRACT

An antenna device, a positioning system and a positioning method are provided. The positioning method includes: dispersedly arranging a plurality of receivers to form a target area, in which each of the receivers includes the antenna device; receiving a wireless signal from the target area through the antenna device, and generating a difference signal strength and a sum signal strength; calculating, for each of the receivers, a sum-difference ratio between the difference signal strength and the sum signal strength, and estimating a corresponding one of estimated incident angles according to the sum-difference ratio and a comparison table; executing, in response to obtaining the estimated incident angles corresponding to the receivers, a positioning algorithm according to the estimated incident angles, so as to generate a plurality of possible positions; and executing an optimization algorithm to calculate a best estimated position of the possible positions.

18 Claims, 7 Drawing Sheets

ANTENNA DEVICE, POSITIONING SYSTEM AND POSITIONING METHOD

CROSS-REFERENCE TO RELATED PATENT APPLICATION

This application claims the benefit of priority to Taiwan Patent Application No. 110129215, filed on Aug. 9, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna device, a positioning system and a positioning method, and more particularly to an antenna device with a simple structure and low cost, and a high-precision positioning system and a positioning method using the antenna device.

BACKGROUND OF THE DISCLOSURE

In an outdoor environment, the global positioning system (GPS) is the most widely used positioning method. A positioning accuracy of the global positioning system is about 3 to 5 meters, or may only be 10 meters if the global positioning system is greatly affected by the terrain and geographical features. In particular, GPS signals are difficult to be received in an indoor environment, and other positioning methods must be relied on.

In the recent development of positioning systems, positioning based on WI-FI signals is most prevalent since WI-FI systems are widely distributed in various areas and no additional infrastructure is required. The WI-FI based positioning has a low cost, and its positioning accuracy can also reach 3 to 5 meters or less. In addition, due to the rise of the Internet of Things (IoTs), the importance of WI-FI in the positioning field is gradually increasing.

However, in a time when the volume of high-tech products is becoming smaller, low-directivity antenna structures that are flat and small are rarely used for achieving high accuracy with small passive detection radars.

SUMMARY OF THE DISCLOSURE

In response to the above-referenced technical inadequacies, the present disclosure provides an antenna device with a simple structure and low cost, and a high-precision positioning system and a positioning method using the antenna device.

In one aspect, the present disclosure provides an antenna device, which includes a common ground metal layer, a first dielectric layer, a first antenna, a second antenna, a second dielectric layer, and a coupler. The common ground metal layer has a first side and a second side. The first dielectric layer is disposed on the first side of the common ground metal layer. The first antenna is disposed on one side of the first dielectric layer opposite to the common ground metal layer, and has a first metal patch and a first microstrip line connected to each other. The first microstrip line has a first feeding point. The second antenna is disposed on the side of the first dielectric layer opposite to the common ground metal layer, spaced apart from the first antenna by a predetermined distance, and has a second metal patch and a second microstrip line connected to each other. The second microstrip line has a second feeding point. The second dielectric layer is disposed on the second side of the common ground metal layer. The coupler is disposed on one side of the second dielectric layer opposite to the common ground metal layer, and has a first input terminal, a second input terminal, a difference output terminal and a sum output terminal. The first input terminal is connected to the first antenna through the first feeding point, and the second input terminal is connected to the second antenna through the second feeding point. The first antenna and the second antenna commonly operate in a predetermined frequency band, and the predetermined distance is associated with a predetermined wavelength corresponding to the predetermined frequency band.

In some embodiments, the first input terminal and the first antenna are connected at the first feeding point through a via, and the second input terminal and the second antenna are connected at the second feeding point through another via.

In some embodiments, the predetermined distance is within a range from 0.4 to 0.6 times the predetermined wavelength.

In some embodiments, a first phase difference is provided between the sum output terminal and the first input terminal, a second phase difference is provided between the sum output terminal and the second input terminal, a third phase difference is provided between the difference output terminal and the first input terminal, a fourth phase difference is provided between the difference output terminal and the second input terminal, the first phase difference is equal to the second phase difference, and the third phase difference and the fourth phase difference differ by 90 degrees.

In another aspect, the present disclosure provides a positioning system, which includes a plurality of receivers and a computing device. The plurality of receivers are dispersedly arranged to form a target area, and each of the plurality of receivers includes an antenna device, a first wireless network interface controller, and a second wireless network interface controller. The antenna device includes a coupler, a first antenna, and a second antenna. The coupler has a first input terminal, a second input terminal, a difference output terminal and a sum output terminal. The first antenna is connected to the first input terminal. The second antenna is connected to the second input terminal, and is spaced apart from the first antenna by a predetermined distance. The first wireless network interface controller is connected to the difference output terminal. The first wireless network interface controller is configured to receive a wireless signal from the target area through the antenna device, and process an output signal of the difference output terminal to generate a difference signal strength. The second wireless network interface controller is connected to the sum output terminal. The second wireless network interface controller is configured to receive the wireless signal from the target area through the antenna device, and process another output signal of the sum output terminal to generate a sum signal strength. The computing device is communicatively connected to the plurality of receivers, and includes a processing module and a storage module. The processing module is configured to: execute, for each of the plurality of receivers, following actions: calculating a ratio between the sum signal strength and the difference signal strength to obtain a sum-difference ratio; and estimating, according to the sum-difference ratio and a comparison table stored in the storage module, one of multiple estimated incident angles that corresponds to the sum-difference ratio, in which the comparison table defines a relationship between a plurality of ratios and a plurality of angles; execute, in response to obtaining the estimated incident angles corresponding to the receivers, a positioning algorithm according to the estimated incident angles, so as to generate a plurality possible positions; and execute an optimization algorithm to calculate a best estimated position of the possible positions.

In some embodiments, a quantity of the plurality of receivers is at least three, and the target area forms a polygon with the plurality of receivers taken as vertices.

In some embodiments, each of the plurality of receivers has one of a plurality of receiving directions, and the receiving directions of the plurality of receivers are toward an inner point of the polygon.

In some embodiments, the comparison table is obtained by: measuring a sum pattern and a difference pattern of the antenna device in a non-reflective room, obtaining a ratio of the sum pattern and the difference pattern, and recording a variation of the ratio of the sum pattern and the difference pattern that varies with the angles.

In some embodiments, the sum pattern and the difference pattern are symmetrical with respect to a receiving direction, and a quantity of the estimated incident angles corresponding to one of the receivers is two.

In some embodiments, the positioning algorithm is a pseudo-inverse matrix method.

In some embodiments, the optimization algorithm is a least residual sum of squares (RSS) search method.

In yet another aspect, the present disclosure provides a positioning method, which includes: dispersedly arranging a plurality of receivers to form a target area, in which each of the receivers includes an antenna device, a first wireless network interface controller, and a second wireless network interface controller. The antenna device includes a coupler, a first antenna, and a second antenna. The coupler has a first input terminal, a second input terminal, a difference output terminal and a sum output terminal. The first antenna is connected to the first input terminal. The second antenna is connected to the second input terminal, and is spaced apart from the first antenna by a predetermined distance. The first wireless network interface controller is connected to the difference output terminal. The second wireless network interface controller is connected to the sum output terminal. The positioning method further includes: configuring the first wireless network interface controller to receive a wireless signal from the target area through the antenna device, and process an output signal of the difference output terminal to generate a difference signal strength; configuring the second wireless network interface controller to receive the wireless signal from the target area through the antenna device, and process another output signal of the sum output terminal to generate a sum signal strength; configuring a computing device to be communicatively connected to the receivers, in which the computing device includes a processing module and a storage module; and configuring the processing module to: execute, for each of the plurality of receivers, following actions: calculating a ratio between the sum signal strength and the difference signal strength to obtain a sum-difference ratio; and estimating, according to the sum-difference ratio and a comparison table stored in the storage module, an estimated incident angle corresponding to the sum-difference ratio, in which the comparison table defines a correspondence between a plurality of ratios and a plurality of angles. The positioning method further includes configuring the processing module to: execute, in response to obtaining the estimated incident angles corresponding to the receivers, a positioning algorithm according to the estimated angles to generate a plurality of possible positions; and execute an optimization algorithm to calculate a best estimated position of the possible positions.

Therefore, in the antenna device, the positioning system, and the positioning method provided by the present disclosure, planar antennas and a rat-race coupler are integrated into a novel receiving antenna architecture, the sum and difference patterns can be directly obtained, and the sum-difference ratio of the sum and difference patterns can be used to obtain incident angles of signals. Accordingly, the whole antenna device can be integrated and achieve miniaturization.

In addition, in the antenna device, the positioning system, and the positioning method provided by the present disclosure, when the receiving directions of the antenna device are set toward a center of the target area, an average positioning error of the entire area can be obtained by cooperation with the pseudo-inverse matrix method. The average positioning error is 2 km, which is 2% of a length or a width of the area. Therefore, even if an angle error increases with the incident angle, the pseudo-inverse matrix calculation can improve the angle error. Moreover, the least RSS search method can overcome an issue of not being able to determine a precise position of an object to be positioned due to symmetry of the pattern.

Furthermore, by using the antenna device, the positioning system, and the positioning method provided by the present disclosure, only strengths of the measured signals are used in the computation of the positioning process, so that phases do not need to be measured. As such, an entire architecture of the antenna device and the positioning system can be greatly simplified.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
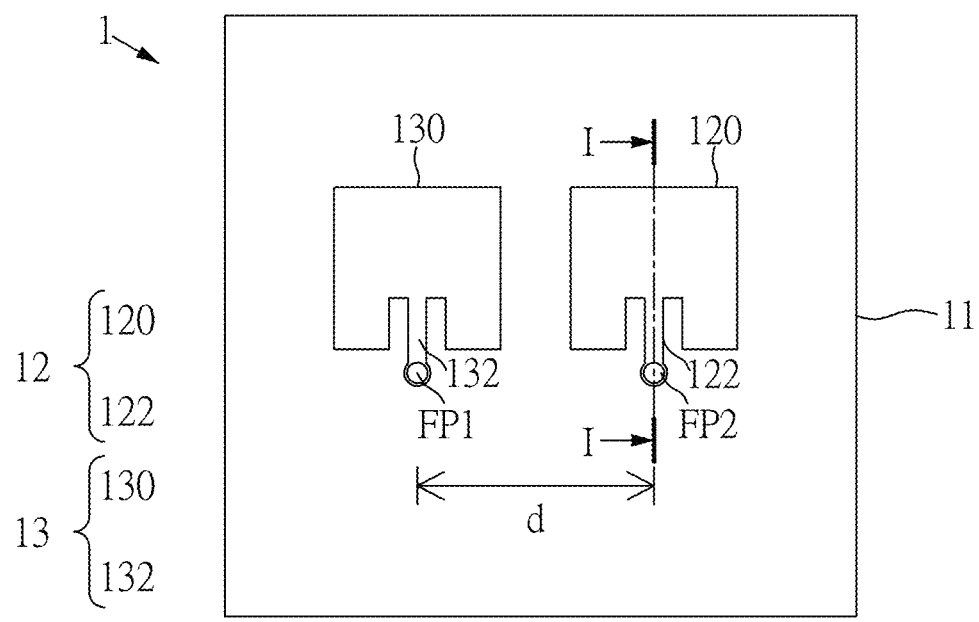
FIG. 1 is a schematic top view of a first side of an antenna device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
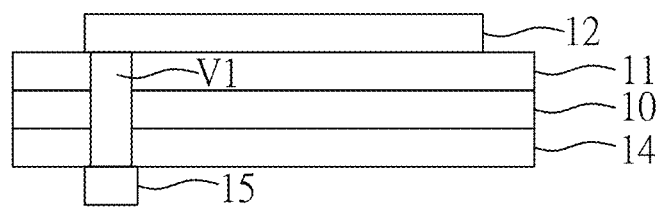
FIG. 2 is a cross-sectional view taken along a section line I-I of FIG. 1.
Figure 3:
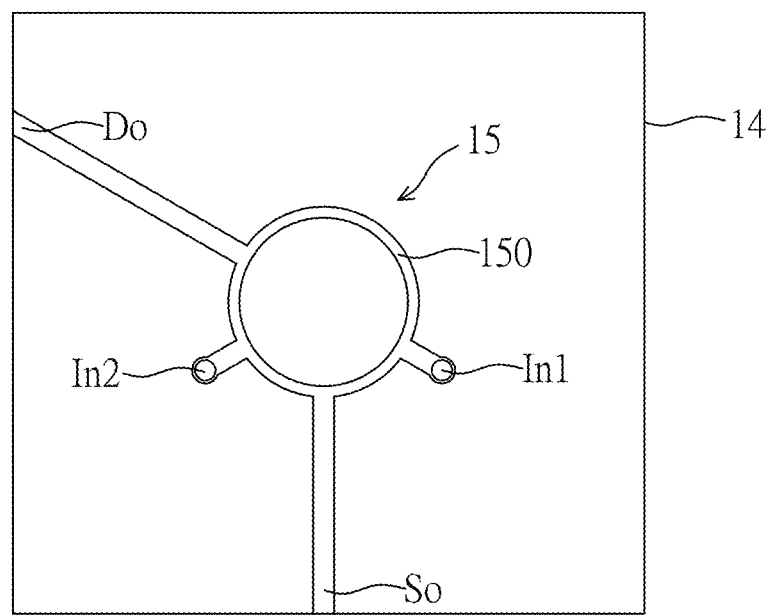
FIG. 3 is a schematic top view of a second side of the antenna device according to the first embodiment of the present disclosure.

FIG. 1 is a schematic top view of a first side of an antenna device according to a first embodiment of the present disclosure. FIG. 2 is a cross-sectional view of FIG. 1 along a section line I-I. FIG. 3 is a schematic top view of a second side of the antenna device according to the first embodiment of the present disclosure.

Referring to FIGS. 1 to 3, the first embodiment of the present disclosure provides an antenna device 1, which includes a common ground metal layer 10, a first dielectric layer 11, a first antenna 12, a second antenna 13, a second dielectric layer 14, and a coupler 15.

In order to reduce a volume of a receiving end as much as possible, a microstrip antenna is utilized as a receiving antenna of the antenna device 1, and is applied to a WI-FI 2.4 GHz frequency band as a predetermined frequency band.

The common ground metal layer 10 has a first side and a second side, and the first dielectric layer 11 is disposed on the first side of the common ground metal layer 10. This structure can, for example, use a glass fiber as the first dielectric layer 11 and a copper foil as the common ground metal layer 10.

The first antenna 12 is disposed on one side of the first dielectric layer 11 opposite to the common ground metal layer 10, and has a first metal patch 120 and a first microstrip line 122 connected to each other, and the first microstrip line 122 has a first feeding point FP1. Similarly, the second antenna 13 is arranged on a first side of the first dielectric layer 11, separated from the first antenna 12 by a predetermined distance d, and has a second metal patch 130 and a second microstrip line 132 connected to each other, and the second microstrip line 132 has a second feeding point FP2. The first antenna 12 and the second antenna 13 commonly operate in a predetermined frequency band (that is, the aforementioned WI-FI 2.4 GHz frequency band).

In the present embodiment, the first metal patch 120 and the second metal patch 130 may be rectangular, and an area thereof is associated with a predetermined wavelength corresponding to the predetermined frequency band. In detail, in a design of an antenna, an area of the antenna is determined according to a resonant frequency that is expected to be utilized. The area is related to a wavelength. Since WI-FI Channel 6 is expected to be received and a center frequency thereof is 2.43 GHz, the corresponding wavelength is 12.34 cm. In some embodiments of the present disclosure, 4003C laminates manufactured by Rogers Corporation are used, which have a dielectric constant $E_r$ of about 3.55 and a thickness of 1.52 cm. According to the principle of designing a planar antenna, a calculation shows that about ¼ of the wavelength can cause resonance and generate radiation. On the other hand, the first microstrip line 122 and the second microstrip line 132 with an impedance $Z_0$ of 50Ω are utilized as feeding terminals.

As shown in FIGS. 2 and 3, the second dielectric layer 14 is disposed on the second side of the common ground metal layer 10. Similarly, the glass fiber can, for example, be used as the second dielectric layer 14.

The coupler 15 can be, for example, a rat-race coupler. The coupler 15 is arranged on a side of the second dielectric layer 14 opposite to the common ground metal layer 10, and has a ring body 150 and a first input terminal In1, a second input terminal In2, a difference output terminal Do, and a sum output terminal So that are arranged along the ring body 150. For the coupler 15, an important parameter that determines a size of the coupler 15 is still the predetermined wavelength corresponding to the predetermined frequency band (WI-FI 2.4 GHz). Therefore, at 2.4 GHz, a predetermined wavelength value is calculated to be 12.5 cm. It should be noted that using the rat-race coupler as the coupler 15 is only one of the configurations, and the present disclosure is not limited thereto. The coupler 15 can also be implemented by other planar coupler structures.

In a signal transmission path of the coupler 15, a first phase difference is provided between the output terminal So and the first input terminal In1, a second phase difference is provided between the output terminal So and the second input terminal In2, a third phase difference is provided between the difference output terminal Do and the first input terminal In2, and a fourth phase difference is provided between the difference output terminal Do and the second input terminal In2.

In this embodiment, the difference output terminal Do, the first input terminal In1, the sum output terminal So, and the second input terminal In2 are sequentially arranged along the ring body 150. In order to output a sum pattern and a difference pattern, signals of the first input terminal In1 and the second input terminal In2 are designed to be in phase at the output terminal So, while the signals of the first input terminal In1 and the second input terminal In2 are designed to be in reverse phase at the difference output terminal Do. Therefore, the first phase difference is equal to the second phase difference, and corresponding arc lengths can be designed to be ¼ of the predetermined wavelength. The third phase difference and the fourth phase difference differ by 90 degrees, and the corresponding arc lengths can thus be designed to differ by ¼ of the predetermined wavelength.

According to the above conditions and the predetermined wavelength, it can be observed that a circumference of the ring body 150 is 3⁄2 of the predetermined wavelength, which is about 18.75 cm. Further, the width of the ring body 150 can be determined by matching impedances of the first microstrip line 122 and the second microstrip line 132. In other words, the impedance $Z_0$ of 50Ω can also be used as the matching impedances, and an impedance of the ring body 150 is $\sqrt{2}Z_0$, which is about 70.7Ω. Therefore, the width of the ring body 150 is about 1.86 mm, and the width at 50Ω feeding terminal is 3.41 mm.

In order to reduce redundant wirings between the first antenna 12, the second antenna 13 and the coupler 15, the first input terminal In1 is connected to the first antenna 12 through the first feeding point FP1, the second input terminal In2 is connected to the second antenna 13 through the second feeding point FP2, and circuits are connected through vias V1. In other words, the first input terminal In1 and the first antenna 12 are connected at the first feeding point FP1 through a via, and the second input terminal In2 and the second antenna 13 are connected at the second feeding point FP2 through another via. In this embodiment, 50Ω subminiature version A (SMA) coaxial connectors can be further provided at the sum output terminal So and the difference output terminal Do, so as to output the sum pattern and the difference pattern.

Figure 4:
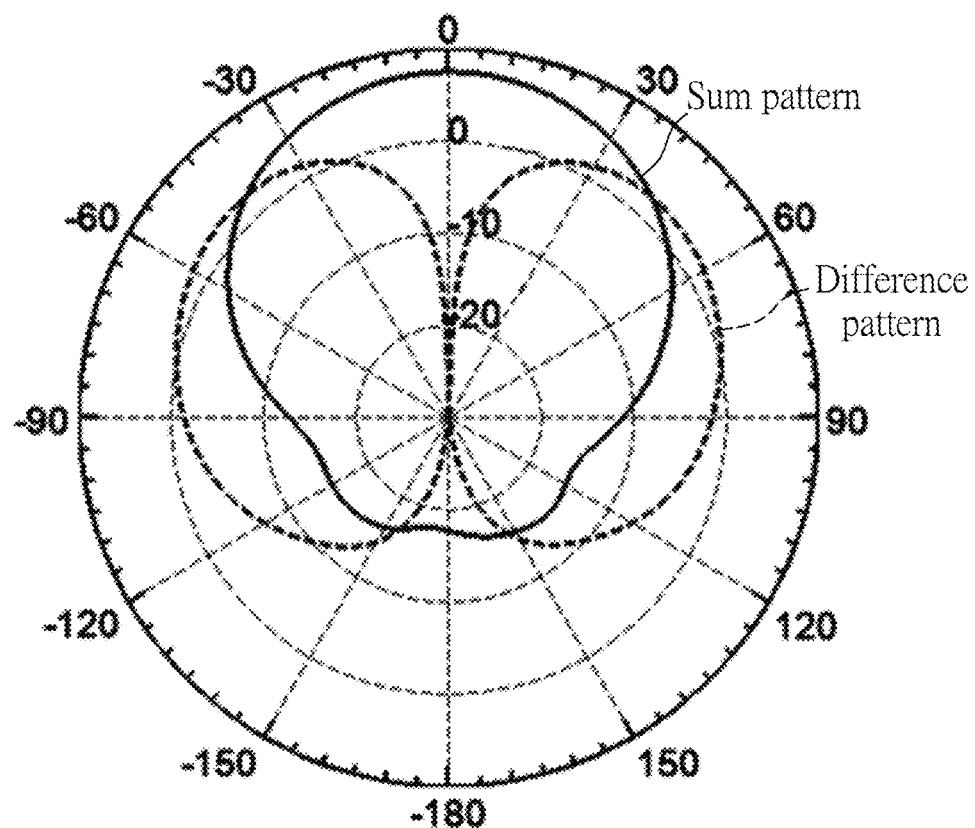
FIG. 4 is a simulation result of a sum pattern and a difference pattern of the antenna device at a predetermined interval of 0.3 times of a wavelength according to the first embodiment of the present disclosure.

In addition, variations of the patterns of the output terminal So and the difference output terminal Do are related to the predetermined distance d between the first antenna 12 and the second antenna 13. In order to obtain a one-to-one correspondence between incident angles and pattern strengths of signals, as shown in FIG. 4, the pattern of the antenna device 1 is simulated by a high frequency simulation system (HFSS). FIG. 4 is a simulation result of a sum pattern and a difference pattern of the antenna device according to the first embodiment of the present disclosure at a predetermined interval of 0.3 times a wavelength.

It can be seen from FIG. 4 that, when the distance between the two antennas is less than ½ of the wavelength, since a beam width of the sum pattern becomes wider, a range of angles that can be used for determination increases; however, the accuracy consequently decreases. In the same way, when the distance between the two antennas is greater than ½ of a predetermined wavelength λ, a main beam width of the sum pattern becomes narrower, thereby causing a decrease in a range of angles that can be used for determination. However, the accuracy in determining the angle within the range is improved.

Figure 5:
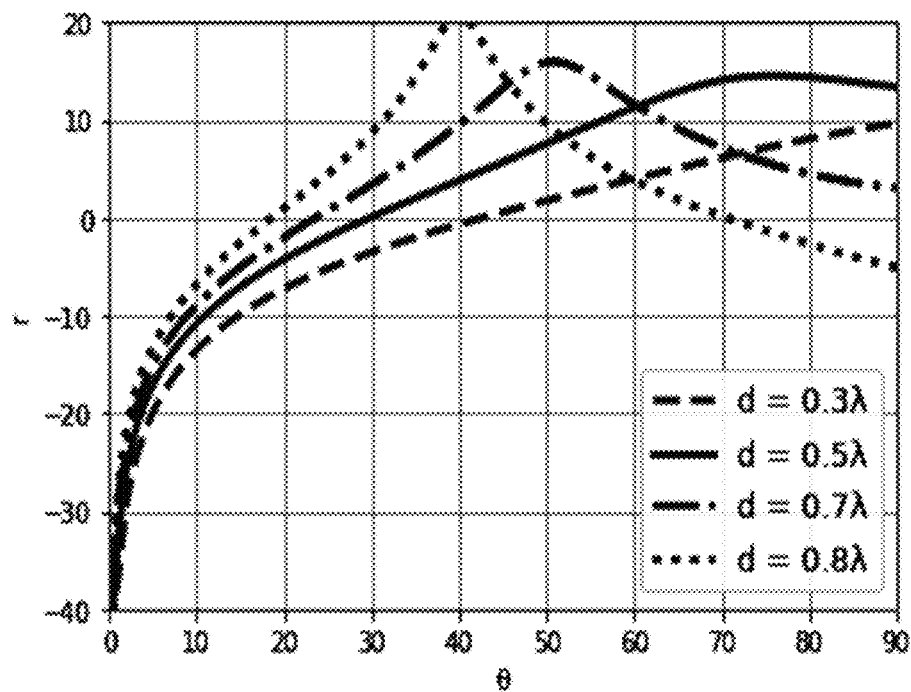
FIG. 5 is a simulation result of a ratio of the sum pattern and the difference pattern of the antenna device under different predetermined intervals according to the first embodiment of the present disclosure.

Further reference can be made to FIG. 5, which is a simulation result of a ratio of the sum pattern and the difference pattern of the antenna device according to the first embodiment of the present disclosure under different predetermined intervals. As shown in FIG. 5, a 0.3λ curve in FIG. 5 has a wide range of a viewing angle, but a slope thereof is small. While a 0.7λ curve has a large slope, the viewing angle is small. The result shown also determines that the predetermined distance d should ideally be set to λ/2. It can also be seen from FIG. 5 that, when the predetermined distance d is taken as λ/2, a range from 0 to 50 degrees is the best positioning angle range with the slope being taken into consideration. In some embodiments, the predetermined distance d can be within a range from 0.4 to 0.6 times the predetermined wavelength λ. Preferably, the predetermined distance d can be 0.4 times, 0.5 times, or 0.6 times the predetermined wavelength λ.

Therefore, in the antenna device provided in the first embodiment of the present disclosure, planar antennas and the rat-race coupler are integrated into a novel receiving antenna architecture, the sum and difference patterns can be directly obtained, and a sum-difference ratio of the sum and difference patterns can be used to obtain incident angles of signals. The antenna device has a simplified architecture, is low in cost, and can achieve miniaturization at the same time.

Second Embodiment

Figure 6:
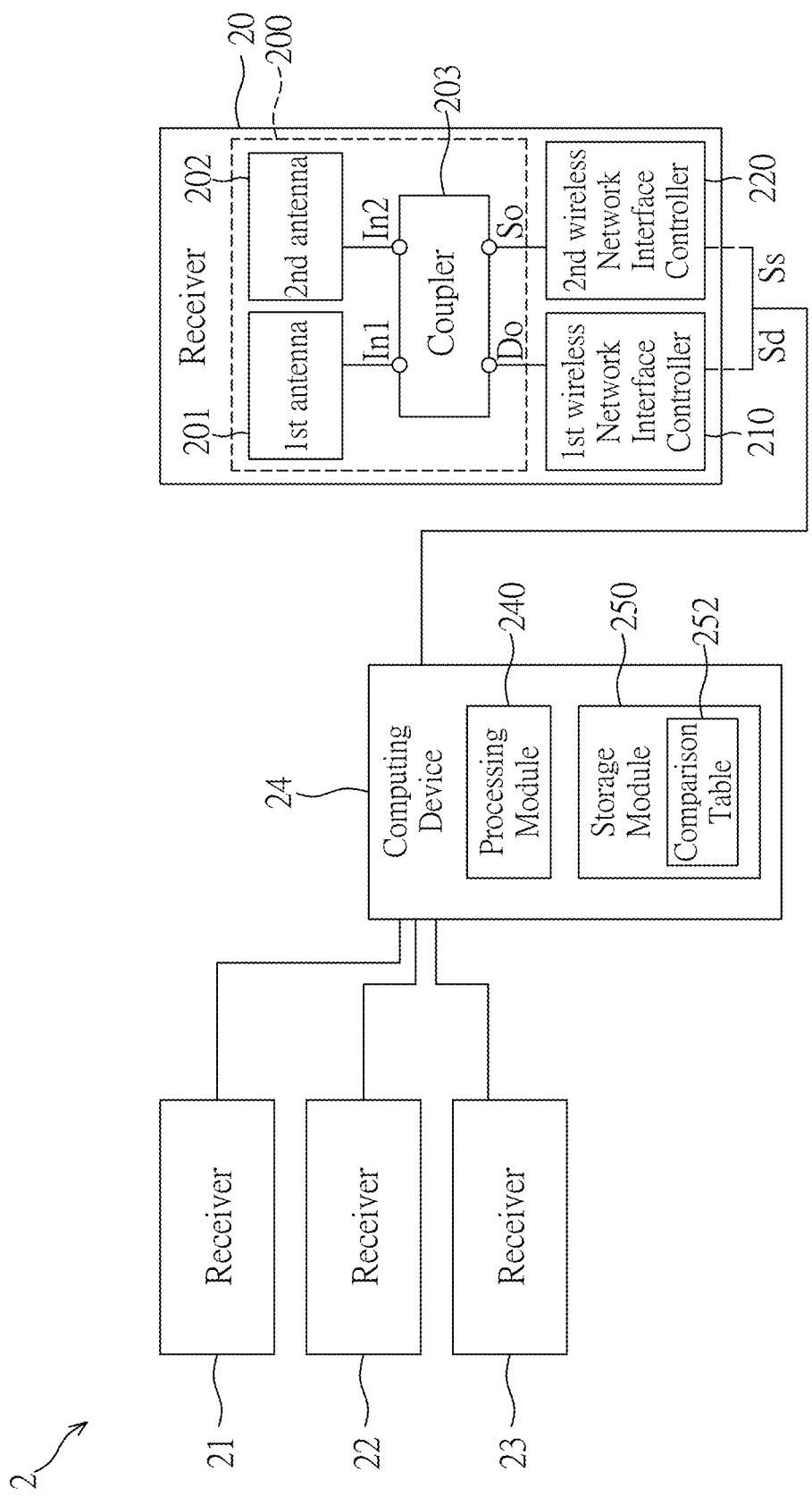
FIG. 6 is a functional block diagram of a positioning system according to a second embodiment of the present disclosure.
Figure 7:
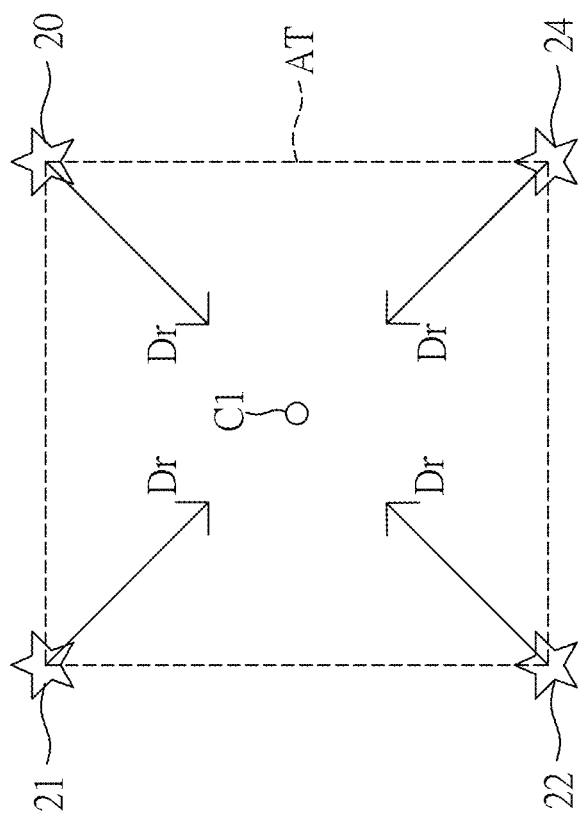
FIG. 7 is a schematic diagram showing a configuration of a plurality of receivers and a target area according to the second embodiment of the present disclosure.

FIG. 6 is a functional block diagram of a positioning system according to a second embodiment of the present disclosure, and FIG. 7 is a schematic diagram showing a configuration of a plurality of receivers and a target area according to a second embodiment of the present disclosure. Referring to FIG. 6 and FIG. 7, the second embodiment of the present disclosure provides a positioning system 2, which includes a plurality of receivers 20, 21, 22, 23 and a computing device 24.

The receivers 20, 21, 22, and 23 are dispersedly arranged to form a target area TA. The receivers 20, 21, 22, and 23 have the same architecture, in which the receiver 20 is used for illustrative purposes. The receiver 20 includes an antenna device 200, a first wireless network interface controller 210, and a second wireless network interface controller 220.

The antenna device 200 includes a first antenna 201, a second antenna 202, and a coupler 203. It should be noted that since the antenna device 200 is vastly similar to the antenna device 1 of the first embodiment, details regarding the same will not be reiterated herein. Further, although microstrip antennas are utilized to implement the first antenna 201 and the second antenna 202 in this embodiment, the present disclosure is not limited to microstrip antennas. The first antenna 201 and the second antenna 202 can be implemented by other planar antenna structures.

As shown in FIG. 6, the coupler 203 can also be, for example, a rat-race coupler, and has a first input terminal In1, a second input terminal In2, a difference output terminal Do, and an output terminal So. The first antenna 201 is connected to the first input terminal In1. The second antenna 202 is connected to the second input terminal In2, and the second antenna 202 is spaced apart from the first antenna 201 by a predetermined distance d (as shown in FIG. 1). It should be noted that using the rat-racing coupler as the coupler 203 in FIG. 6 is only one of the configurations, and the present disclosure is not limited thereto. The coupler 203 can also be implemented by other sum-and-difference couplers with a planar structure, so as to output a sum signal that adds two input signals and a difference signal that subtracts the two input signals.

The first wireless network interface controller 210 is connected to the difference output terminal Do, and is configured to receive a wireless signal from a target area AT through the antenna device 200, and process an output signal of the difference output terminal Do to generate a difference signal strength Sd. Furthermore, the second wireless network interface controller 220 is connected to the sum output terminal So, and is configured to receive the wireless signal from the target area AT through the antenna device 200, and process another output signal of the sum output terminal So to generate a sum signal strength Ss.

The first wireless network interface controller 210 and the second wireless network interface controller 220 can be, for example, wireless network cards, so as to control the antenna device 200 to operate in a WI-FI 2.4 GHz frequency band for receiving the wireless signal from the target area TA.

The computing device 24 is communicatively connected to the receivers 20, 21, 22, and 23, and includes a processing module 240 and a storage module 250. The computing device 24 can include any suitable processor-driven computing device such as, but not limited to, a desktop computing device, a laptop computing device, a server, a smart phone, and a tablet computer. The processing module 240 can be an integrated circuit, such as a programmable logic controller circuit, a micro-processor circuit, or a micro-control circuit. The storage module 250 can be, for example, a memory system, which can include non-volatile memory (such as flash memory) and system memory (such as DRAM).

In this embodiment, the number of the plurality of receivers is at least three (for example, 4), and the target area AT forms a rectangle with the receivers 20, 21, 22, and 23 as vertices (as shown in FIG. 7). In addition, each of the receivers has a receiving direction Dr, and the receiving directions Dr of the receivers are toward a center point Cl of the rectangle.

After an architecture of the positioning system 2 is illustrated, a positioning method of the present disclosure is described below with reference to FIG. 8. The positioning method is applicable to the positioning system 1, but the present disclosure is not limited thereto.

Figure 8:
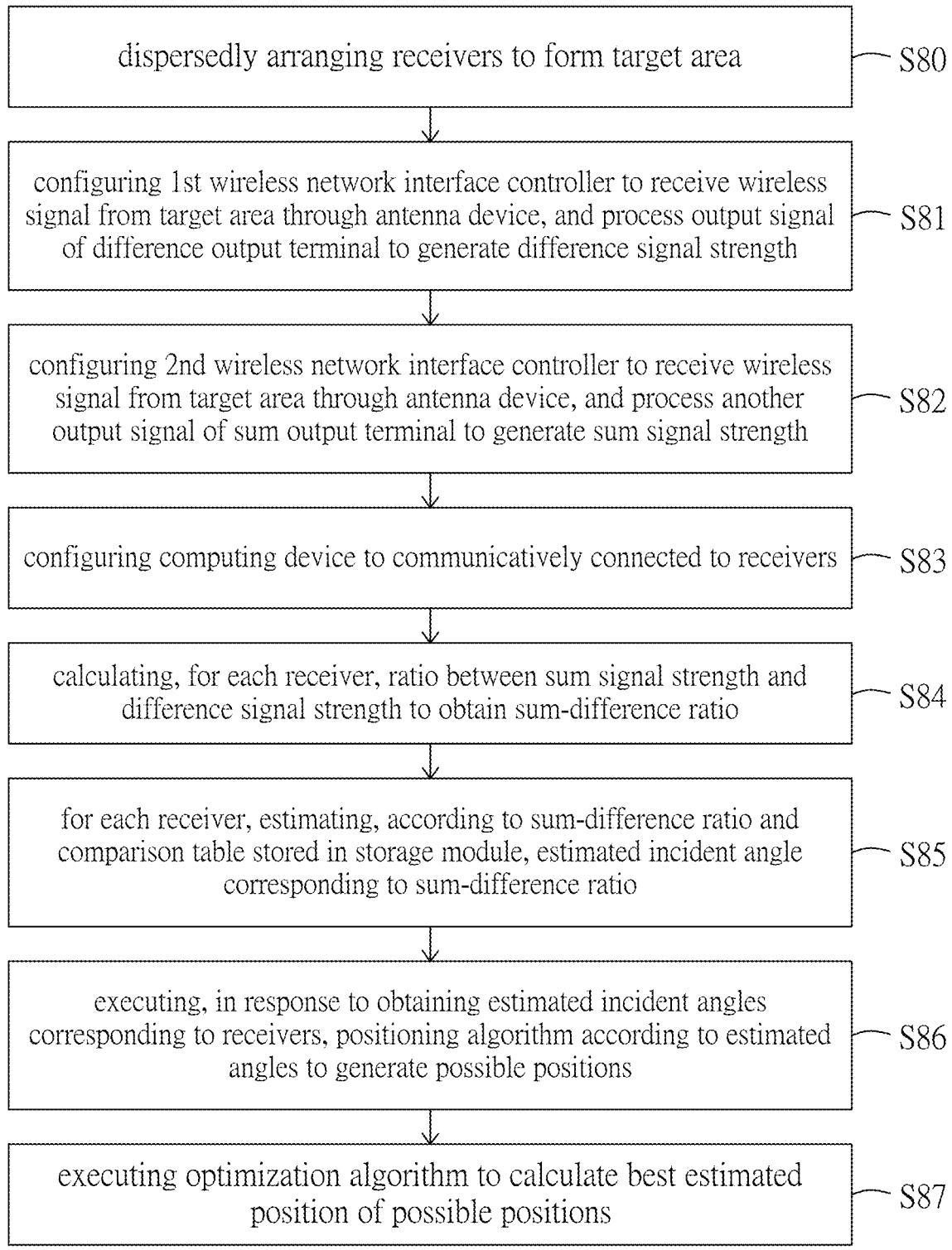
FIG. 8 is a flowchart of a positioning method according to the second embodiment of the present disclosure.

FIG. 8 is a flowchart of a positioning method according to a second embodiment of the present disclosure. As shown in FIG. 8, the positioning method includes the following steps.

Step S80: dispersedly arranging a plurality of receivers to form a target area AT. This step is shown in FIG. 7, and details thereof are not repeated hereinafter.

For each receiver, steps S81 and S82 are executed.

Step S81: configuring the first wireless network interface controller to receive a wireless signal from the target area through the antenna device, and process an output signal of the difference output terminal to generate a difference signal strength.

Step S82: configuring the second wireless network interface controller to receive the wireless signal from the target area through the antenna device, and process another output signal of the sum output terminal to generate a sum signal strength.

Step S83: configuring the computing device to communicatively connected to the receivers. The computing device 24 can, for example, be connected to the receivers 20, 21, 22, 23 in a wired or a wireless manner.

The processing module 250 is configured to perform the following steps.

Step S84: calculating, for each receiver, a ratio between the sum signal strength and the difference signal strength to obtain a sum-difference ratio.

Step S85: for each receiver, estimating, according to the sum-difference ratio and a comparison table stored in the storage module, an estimated incident angle corresponding to the sum-difference ratio.

In detail, the comparison table 252 is stored in the storage module 250, and defines a correspondence between a plurality of ratios and a plurality of angles. For example, for the sum and difference patterns of FIG. 4, there is obviously a one-to-one correspondence between 0 to 90 degrees and 0 to −90 degrees. In other words, different ratios can be calculated for each angle from 0 to 90 degrees. Compared to FIG. 5, a correlation between a ratio r and an angle θ can be further established.

Figure 9:
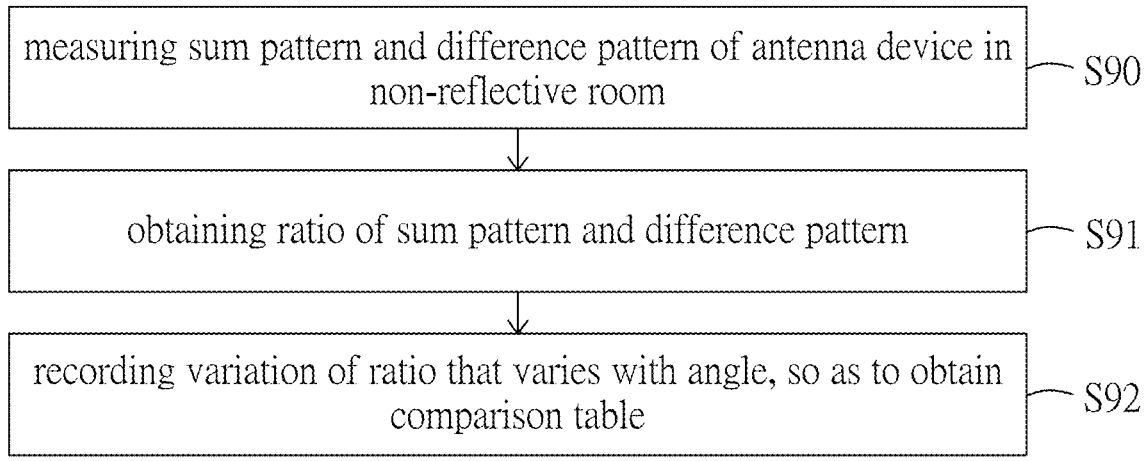
FIG. 9 is a flowchart of establishing a comparison table according to the second embodiment of the present disclosure.

FIG. 9 is a flowchart of establishing a comparison table according to the second embodiment of the present disclosure. The step of establishing the comparison table can include performing the following steps for each receiver.

Step S90: measuring a sum pattern and a difference pattern of the antenna device in a non-reflective room.

Step S91: obtaining a ratio of the sum pattern and the difference pattern.

Step S92: recording a variation of the ratio that varies with the angle, so as to obtain the comparison table.

Step S86: executing, in response to obtaining multiple of the estimated incident angles corresponding to the receivers, a positioning algorithm according to the multiple of estimated angles to generate a plurality of possible positions.

For example, an architecture in FIG. 7 is represented by a two-dimensional coordinate system. Assuming that a real position is (x, y), an estimated angle $\theta_i$ can be calculated through a trigonometric function, and the estimated angle can be expressed by the following equation (1):

$$\theta_i = \tan\left|\frac{y - c_{yi}}{x - c_{xi}}\right|; \quad \text{equation (1)}$$

where $C_{xi}$ and $C_{yi}$ are the coordinates of the receiver. The obtained $\theta_i$ is used to represent a linear equation corresponding to the receiver, which can be expressed by the following equation (2):

$$\sin\theta_i \cdot x \pm \cos\theta_i \cdot y = b_i = \sin\theta_i \cdot c_{xi} \pm \cos\theta_i \cdot c_{yi}; \text{ and } i=1, \ldots, 4 \quad \text{equation (2);}$$

After four linear equations formed by the four receivers are obtained, the positioning method proceeds to perform a main positioning algorithm. In one embodiment of the present disclosure, a pseudo-inverse method can be used as the positioning algorithm.

The pseudo-inverse matrix method is a method of finding the best solution of a matrix with the smallest error. Supposing that a linear relationship is expressed as Hx=b, $H \in R^{m \times n}$, $b \in R^{m \times 1}$ and m>n, since the number of equations is more than unknowns, a solution that fully satisfies the equations cannot be obtained. Therefore, the best solution must be obtained through the quasi-inverse matrix method, which can be solved by the following equation (3):

$$x = (H^T H)^{-1} H^T b \quad \text{equation (3).}$$

Therefore, the four linear equations obtained by equation (2) are substituted to obtain:

$$H = \begin{bmatrix} -\sin\theta_1 & \cos\theta_1 \\ \sin\theta_2 & \cos\theta_2 \\ \sin\theta_3 & \cos\theta_3 \\ -\sin\theta_4 & \cos\theta_4 \end{bmatrix}, \text{ and } b = \begin{bmatrix} b_1 \\ b_2 \\ b_3 \\ b_4 \end{bmatrix}.$$

In this embodiment, the sum pattern and the difference pattern are symmetrical with respect to the receiving direction Dr, and the number of the estimated angles corresponding to one of the receivers is two. In this embodiment, since the sum and difference patterns generated by the receiver are symmetrical, after the ratio is obtained, determining whether the corresponding angle is at the left side or the right side is impossible. Therefore, there are 16 possible combinations for 4 base stations, and the best solution is to be found among these solutions.

Step S87: executing an optimization algorithm to calculate a best estimated position of the possible positions. For example, the optimization algorithm is a least residual sum of squares (RSS) search method. In detail, these possible positions are fitted in a Cartesian coordinate system to generate a fitted regression line ax+by+c=0. Assuming that a coordinate of one of the possible positions are (x0, y0), the shortest distance between the possible position and the regression line is:

$$d = \frac{|ax_0 + by_0 + c|}{\sqrt{a^2 + b^2}}.$$

Next, the possible positions with the smallest distance are found from the possible positions and are used as a plurality of best estimated positions.

Figure 10:
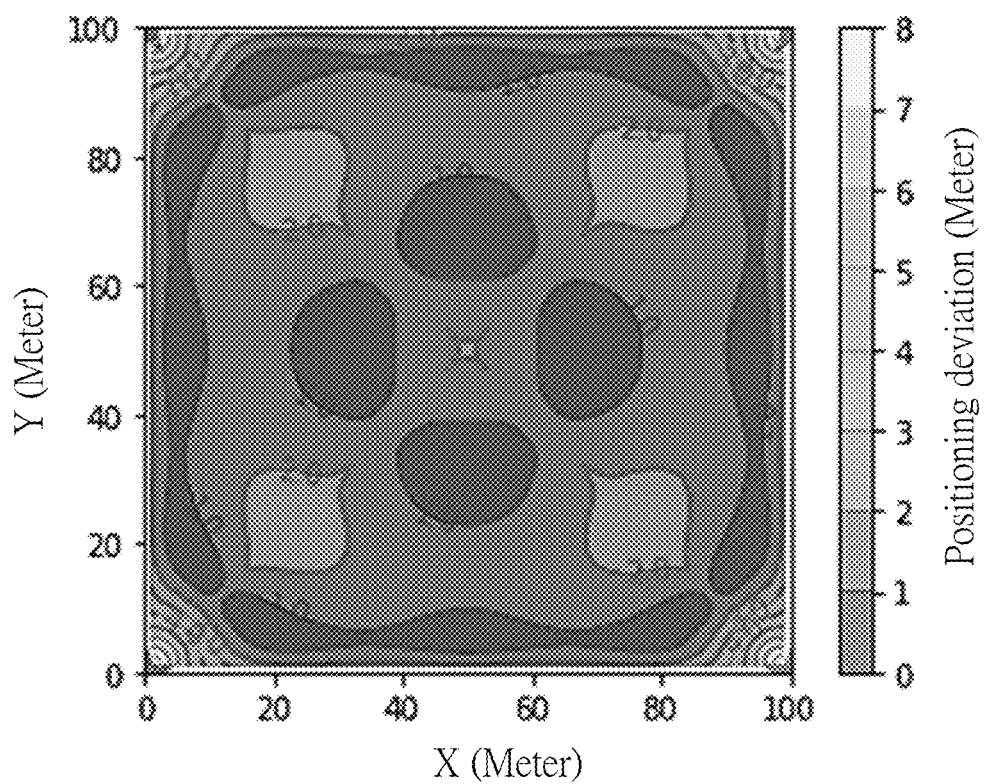
FIG. 10 is a positioning deviation diagram of a positioning result according to the second embodiment of the present disclosure.

Reference is further made to FIG. 10, which is a positioning deviation diagram of a positioning result according to the second embodiment of the present disclosure. As shown in FIG. 10, a positioning range is from (1, 1) to (99, 99), and one positioning point is drawn for every 1 meter. It can be seen from FIG. 10 that, in addition to large errors and rapid changes in positions close to the receiver, positioning deviations of the whole area are all below 3 meters. Since the target area is covered within a receiving range of the antenna device 1 (that is, ±50 degrees), it can be seen from FIG. 10 that even under the condition of a large angle, the positioning deviation can still be suppressed to about 2 meters. Therefore, setting the receiving directions of the receivers toward the center point Cl can ensure an accuracy of the positioning system and the positioning method of the present disclosure.

Beneficial Effects of the Embodiments

In conclusion, in the antenna device, the positioning system, and the positioning method provided by the present disclosure, antennas with the rat-race coupler are integrated into a novel receiving antenna architecture, the sum and difference patterns can be directly obtained, and the sum-difference ratio of the sum and difference patterns can be used to obtain incident angles of signals, such that the whole antenna device can be integrated and achieve miniaturization.

Furthermore, in the antenna device, the positioning system, and the positioning method provided by the present disclosure, only strengths of the measured signals are used in the computing of the positioning process, instead of measuring phases, such that an architecture of the antenna device and the positioning system, as a whole, can be greatly simplified.

In addition, in the antenna device, positioning system and positioning method provided by the present disclosure, when the receiving directions of the antenna devices are set toward a center of the target area, an average positioning error of an entire area can be obtained by cooperation with the pseudo-inverse matrix method. The average positioning error is 2 km, which is 2% of length or width of the area. Therefore, even if the angle error increases with the incident angle, the pseudo-inverse matrix calculation can improve the angle error. Moreover, the least RSS search method can overcome an issue of not being able to determine a precise position of an object to be positioned due to a symmetry of the pattern.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device, comprising:
 a common ground metal layer having a first side and a second side;
 a first dielectric layer disposed on the first side of the common ground metal layer;
 a first antenna disposed on one side of the first dielectric layer opposite to the common ground metal layer, wherein the first antenna has a first metal patch and a first microstrip line connected to each other, and the first microstrip line has a first feeding point;
 a second antenna disposed on the side of the first dielectric layer opposite to the common ground metal layer and being spaced apart from the first antenna by a predetermined distance, wherein the second antenna has a second metal patch and a second microstrip line connected to each other, and the second microstrip line has a second feeding point;
 a second dielectric layer disposed on the second side of the common ground metal layer; and
 a coupler disposed on one side of the second dielectric layer opposite to the common ground metal layer, and having a first input terminal, a second input terminal, a difference output terminal and a sum output terminal, wherein the first input terminal is connected to the first antenna through the first feeding point, and the second input terminal is connected to the second antenna through the second feeding point,
 wherein the first antenna and the second antenna commonly operate in a predetermined frequency band, and the predetermined distance is associated with a predetermined wavelength corresponding to the predetermined frequency band.

2. The antenna device according to claim 1, wherein the first input terminal and the first antenna are connected at the first feeding point through a via, and the second input terminal and the second antenna are connected at the second feeding point through another via.

3. The antenna device according to claim 1, wherein the predetermined distance is within a range from 0.4 to 0.6 times the predetermined wavelength.

4. The antenna device according to claim 1, wherein a first phase difference is provided between the sum output terminal and the first input terminal, a second phase difference is provided between the sum output terminal and the second input terminal, a third phase difference is provided between the difference output terminal and the first input terminal, a fourth phase difference is provided between the difference output terminal and the second input terminal, the first phase difference is equal to the second phase difference, and the third phase difference and the fourth phase difference differ by 90 degrees.

5. A positioning system, comprising:
a plurality of receivers dispersedly arranged to form a target area, wherein each of the plurality of receivers includes:
the antenna device as claimed in claim 1;
a first wireless network interface controller connected to the difference output terminal, wherein the first wireless network interface controller is configured to receive a wireless signal from the target area through the antenna device, and process an output signal of the difference output terminal to generate a difference signal strength; and
a second wireless network interface controller connected to the sum output terminal, wherein the second wireless network interface controller is configured to receive the wireless signal from the target area through the antenna device, and process another output signal of the sum output terminal to generate a sum signal strength; and
a computing device communicatively connected with the receivers, and including a processing module and a storage module, wherein the processing module is configured to:
execute, for each of the plurality of receivers, following actions:
calculating a ratio between the sum signal strength and the difference signal strength to obtain a sum-difference ratio; and
estimating, according to the sum-difference ratio and a comparison table stored in the storage module, one of multiple estimated incident angles that corresponds to the sum-difference ratio, wherein the comparison table defines a relationship between a plurality of ratios and a plurality of angles;
execute, in response to obtaining the estimated incident angles corresponding to the receivers, a positioning algorithm according to the estimated incident angles, so as to generate a plurality of possible positions; and
execute an optimization algorithm to calculate a best estimated position of the possible positions.

6. The positioning system according to claim 5, wherein a quantity of the plurality of receivers is at least three, and the target area forms a polygon with the plurality of receivers taken as vertices.

7. The positioning system according to claim 6, wherein each of the plurality of receivers has one of a plurality of receiving directions, and the receiving directions of the plurality of receivers are toward an inner point of the polygon.

8. The positioning system according to claim 5, wherein the comparison table is obtained by measuring a sum pattern and a difference pattern of the antenna device in a non-reflective room, obtaining a ratio of the sum pattern and the difference pattern, and recording a variation of the ratio of the sum pattern and the difference pattern that varies with the angles.

9. The positioning system according to claim 8, wherein the sum pattern and the difference pattern are symmetrical with respect to a receiving direction, and a quantity of the estimated incident angles corresponding to one of the receivers is two.

10. The positioning system according to claim 5, wherein the positioning algorithm is a pseudo-inverse matrix method.

11. The positioning system according to claim 5, wherein the optimization algorithm is a least residual sum of squares (RSS) search method.

12. A positioning method, comprising:
dispersedly arranging a plurality of receivers to form a target area, wherein each of the receivers includes:
the antenna device as claimed in claim 1;
a first wireless network interface controller connected to the difference output terminal; and
a second wireless network interface controller connected to the sum output terminal;
configuring the first wireless network interface controller to receive a wireless signal from the target area through the antenna device, and process an output signal of the difference output terminal to generate a difference signal strength;
configuring the second wireless network interface controller to receive the wireless signal from the target area through the antenna device, and process another output signal of the sum output terminal to generate a sum signal strength;
configuring a computing device to be communicatively connected to the receivers, wherein the computing device includes a processing module and a storage module; and
configuring the processing module to:
execute, for each of the plurality of receivers, following actions:
calculating a ratio between the sum signal strength and the difference signal strength to obtain a sum-difference ratio; and
estimating, according to the sum-difference ratio and a comparison table stored in the storage module, one of multiple estimated incident angles that correspond to the sum-difference ratio, wherein the comparison table defines a relationship between a plurality of ratios and a plurality of angles;
execute, in response to obtaining the estimated incident angles corresponding to the receivers, a positioning algorithm according to the estimated angles, so as to generate a plurality of possible positions; and
execute an optimization algorithm to calculate a best estimated position of the possible positions.

13. The positioning method according to claim 12, wherein a quantity of the plurality of receivers is at least three, and the target area forms a polygon with the plurality of receivers taken as vertices.

14. The positioning method according to claim 13, wherein each of the plurality of receivers has one of a plurality of receiving directions, and the receiving directions of the plurality of receivers are toward an inner point of the polygon.

15. The positioning method according to claim 13, further comprising:
for each of the plurality of receivers, measuring a sum pattern and a difference pattern of the antenna device in a non-reflective room, obtaining a ratio of the sum pattern and the difference pattern, and recording a variation of the ratio of the sum pattern and the difference pattern that varies with the angles.

16. The positioning method according to claim 15, wherein the sum pattern and the difference pattern are symmetrical with respect to a receiving direction, and a quantity of the estimated incident angles corresponding to one of the receivers is two.

17. The positioning method according to claim 15, wherein the positioning algorithm is a pseudo-inverse matrix method.

18. The positioning method according to claim 15, wherein the optimization algorithm is a least residual sum of squares (RSS) search method.

* * * * *